US012645471B2

(12) United States Patent
Zeng et al.

(10) Patent No.: US 12,645,471 B2
(45) Date of Patent: Jun. 2, 2026

(54) EVENT PROCESSING BASED ON MULTIPLE TIME WINDOWS

(71) Applicant: Lemon Inc., Grand Cayman (KY)

(72) Inventors: Xiangyu Zeng, Los Angeles, CA (US);
Yuan Gao, Los Angeles, CA (US);
Zihe Xu, Los Angeles, CA (US);
Hongyu Xiong, Los Angeles, CA (US);
Han Wang, Los Angeles, CA (US); Bin Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 1063 days.

(21) Appl. No.: 17/731,939

(22) Filed: Apr. 28, 2022

(65) Prior Publication Data

US 2023/0350698 A1     Nov. 2, 2023

(51) Int. Cl.
G06F 9/448          (2018.01)
G06F 18/211         (2023.01)
(Continued)

(52) U.S. Cl.
CPC .......... G06F 9/4488 (2018.02); G06F 18/211 (2023.01); G06F 18/214 (2023.01); G06N 20/00 (2019.01)

(58) Field of Classification Search
CPC .... G06F 9/4488; G06F 18/211; G06F 18/214; G06N 20/00
See application file for complete search history.

(56) References Cited

U.S. PATENT DOCUMENTS 10,635,973 B1 *  4/2020  Dirac ..................... G06N 3/045
11,210,604 B1 * 12/2021  Jeffery .................. G06N 20/00
(Continued)

FOREIGN PATENT DOCUMENTS

CN      113536139 A    10/2021
CN      113610582 A    11/2021
(Continued)

OTHER PUBLICATIONS

International Patent Application No. PCT/SG2023/050283; Int'l Search Report and the Written Opinion; dated Oct. 19, 2023; 10 pages.
(Continued)

*Primary Examiner* — David E Choi
(74) *Attorney, Agent, or Firm* — BakerHostetler

(57) ABSTRACT

Implementations of the present disclosure relate to methods, devices, and computer program products for event processing. In the method, first data associated with a first time window is obtained, the first data comprising a first object and a first group of events that are related to the first object. Second data associated with a second time window is obtained, the second data comprising a second object and a second group of events that are related to the second object, the second time window being different from the first time window. An event model describing an association relationship between an object and an event that is related to the object is determined based on the first and second data. With these implementations, multiple time windows are used in determining the event model, and thus the event model may have better performance in accuracy and immediacy aspects.

18 Claims, 9 Drawing Sheets

800

(51) Int. Cl.
*G06F 18/214* (2023.01)
*G06N 20/00* (2019.01)

(56) References Cited

U.S. PATENT DOCUMENTS

| | | | | |
|---|---|---|---|---|
| 11,366,812 | B2 * | 6/2022 | Carbune | G06F 16/953 |
| 11,386,342 | B2 * | 7/2022 | Chan | G06N 7/00 |
| 11,775,766 | B2 * | 10/2023 | Chen | G06N 3/09 |
| | | | | 704/9 |
| 11,983,742 | B1 * | 5/2024 | Ma | G06Q 30/0242 |
| 12,229,832 | B2 * | 2/2025 | Wachell | G06N 5/025 |
| 2005/0015217 | A1 * | 1/2005 | Weidl | G05B 17/02 |
| | | | | 702/185 |
| 2008/0120288 | A1 | 5/2008 | Guan et al. | |
| 2010/0198680 | A1 * | 8/2010 | Ma | G06Q 30/02 |
| | | | | 705/14.46 |
| 2011/0258049 | A1 | 10/2011 | Ramer et al. | |
| 2012/0303447 | A1 | 11/2012 | Hughes et al. | |
| 2014/0207564 | A1 | 7/2014 | Dubey et al. | |
| 2017/0286997 | A1 * | 10/2017 | Indarapu | G06N 20/00 |
| 2017/0300966 | A1 | 10/2017 | Dereszynski et al. | |
| 2018/0068224 | A1 * | 3/2018 | Chen | G06N 5/02 |
| 2018/0150874 | A1 | 5/2018 | Chen et al. | |
| 2019/0043113 | A1 | 2/2019 | Aarabi | |
| 2019/0130310 | A1 * | 5/2019 | Madhava Rao | G06F 11/3476 |
| 2019/0171950 | A1 * | 6/2019 | Srivastava | G06N 5/04 |
| 2020/0342305 | A1 * | 10/2020 | Du | G06N 3/0442 |
| 2020/0413139 | A1 * | 12/2020 | Ickin | H04N 21/2187 |
| 2021/0103858 | A1 * | 4/2021 | Padmanabhan | G06F 18/24765 |
| 2021/0132759 | A1 * | 5/2021 | Ignatyev | G06F 3/0484 |
| 2022/0327422 | A1 * | 10/2022 | Skogstad | G06N 3/09 |
| 2022/0374301 | A1 * | 11/2022 | Arcand | G06Q 10/0633 |
| 2023/0206111 | A1 * | 6/2023 | Alam | G06N 20/20 |
| | | | | 706/12 |
| 2023/0267475 | A1 * | 8/2023 | Navarro | G06F 16/958 |
| | | | | 705/304 |
| 2024/0012658 | A1 * | 1/2024 | Lin | G06N 5/01 |
| 2024/0036829 | A1 * | 2/2024 | Assunção | G06F 9/453 |
| 2024/0152769 | A1 * | 5/2024 | Rossi | G06Q 10/04 |
| 2024/0330413 | A1 * | 10/2024 | Hamzeh | G10L 15/197 |
| 2024/0346506 | A1 * | 10/2024 | Shallal | G06Q 20/4016 |
| 2024/0386315 | A1 * | 11/2024 | Boucher | G06N 20/00 |
| 2025/0053587 | A1 * | 2/2025 | Coulter | G06F 16/367 |
| 2025/0139378 | A1 * | 5/2025 | Durvasula | G06F 16/285 |
| 2025/0156772 | A1 * | 5/2025 | Rudraraju | G06Q 40/125 |
| 2025/0271369 | A1 * | 8/2025 | Drake | C09D 5/021 |

FOREIGN PATENT DOCUMENTS

| | | |
|---|---|---|
| CN | 108959550 B | 3/2022 |
| CN | 114240493 A | 3/2022 |

OTHER PUBLICATIONS

European Patent Application No. 23796948.0; Extended Search Report; dated Dec. 4, 2025; 9 pages.

* cited by examiner

400A

410A

| LONG-TERM SAMPLE | | | | |
|---|---|---|---|---|
| OBJECT ID | SEND TIME | EVENT | EVENT TIME | LABEL |
| 420A | 422A | 424A | 426A | 428A |

400B

410B

| SHORT-TERM SAMPLE | | | | |
|---|---|---|---|---|
| OBJECT ID | SEND TIME | EVENT | EVENT TIME | LABEL |
| 420B | 422B | 424B | 426B | 428B |

800

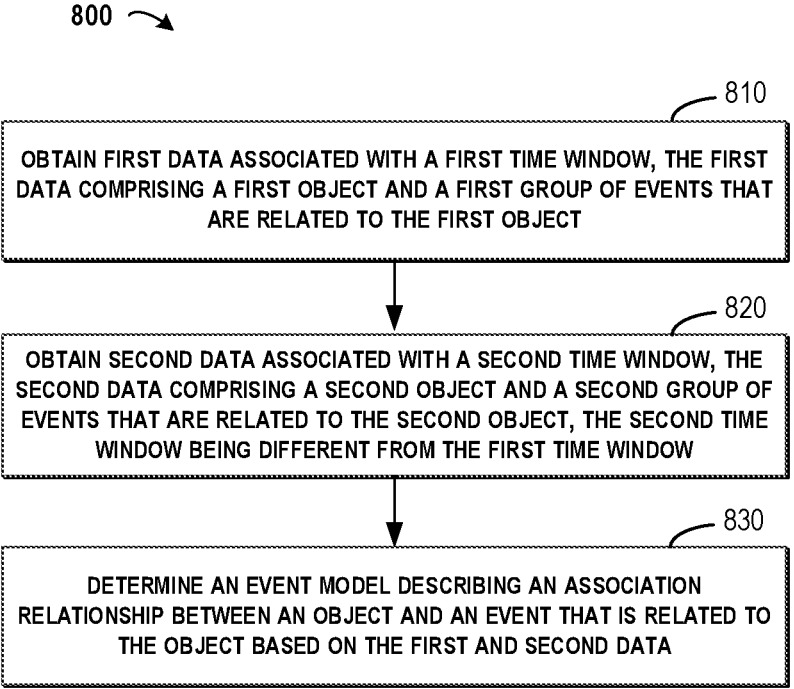

810

OBTAIN FIRST DATA ASSOCIATED WITH A FIRST TIME WINDOW, THE FIRST DATA COMPRISING A FIRST OBJECT AND A FIRST GROUP OF EVENTS THAT ARE RELATED TO THE FIRST OBJECT

820

OBTAIN SECOND DATA ASSOCIATED WITH A SECOND TIME WINDOW, THE SECOND DATA COMPRISING A SECOND OBJECT AND A SECOND GROUP OF EVENTS THAT ARE RELATED TO THE SECOND OBJECT, THE SECOND TIME WINDOW BEING DIFFERENT FROM THE FIRST TIME WINDOW

830

DETERMINE AN EVENT MODEL DESCRIBING AN ASSOCIATION RELATIONSHIP BETWEEN AN OBJECT AND AN EVENT THAT IS RELATED TO THE OBJECT BASED ON THE FIRST AND SECOND DATA

FIG. 8

EVENT PROCESSING BASED ON MULTIPLE TIME WINDOWS

FIELD

The present disclosure generally relates to event processing, and more specifically, to methods, devices and computer program products for event processing based on multiple time windows.

BACKGROUND

Nowadays, the machine learning technique has been widely used in data processing. For example, in a recommendation environment, data such as messages, advertisements and so on may be provided to users. Then, the users may subscript a channel in which the data is provided, buy a product that is recommended in the data, and so on. At this point, events related to the channel, the product and the like may be received. There have been proposed solutions for predicting a trend of events in the future. However, these solutions cannot make a balance between immediacy and the accuracy. At this point, how to process the events in a more effective way becomes a hot focus.

SUMMARY

In a first aspect of the present disclosure, there is provided a method for event processing. In the method, first data associated with a first time window is obtained, the first data comprising a first object and a first group of events that are related to the first object. Second data associated with a second time window is obtained, the second data comprising a second object and a second group of events that are related to the second object, the second time window being different from the first time window. An event model describing an association relationship between an object and an event that is related to the object is determined based on the first and second data.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features and advantages of the present disclosure will become more apparent, wherein the same reference generally refers to the same components in the implementations of the present disclosure.

FIG. 8 illustrates an example flowchart of a method for event processing based on multiple time windows according to implementations of the present disclosure.

DETAILED DESCRIPTION

Figure 1:
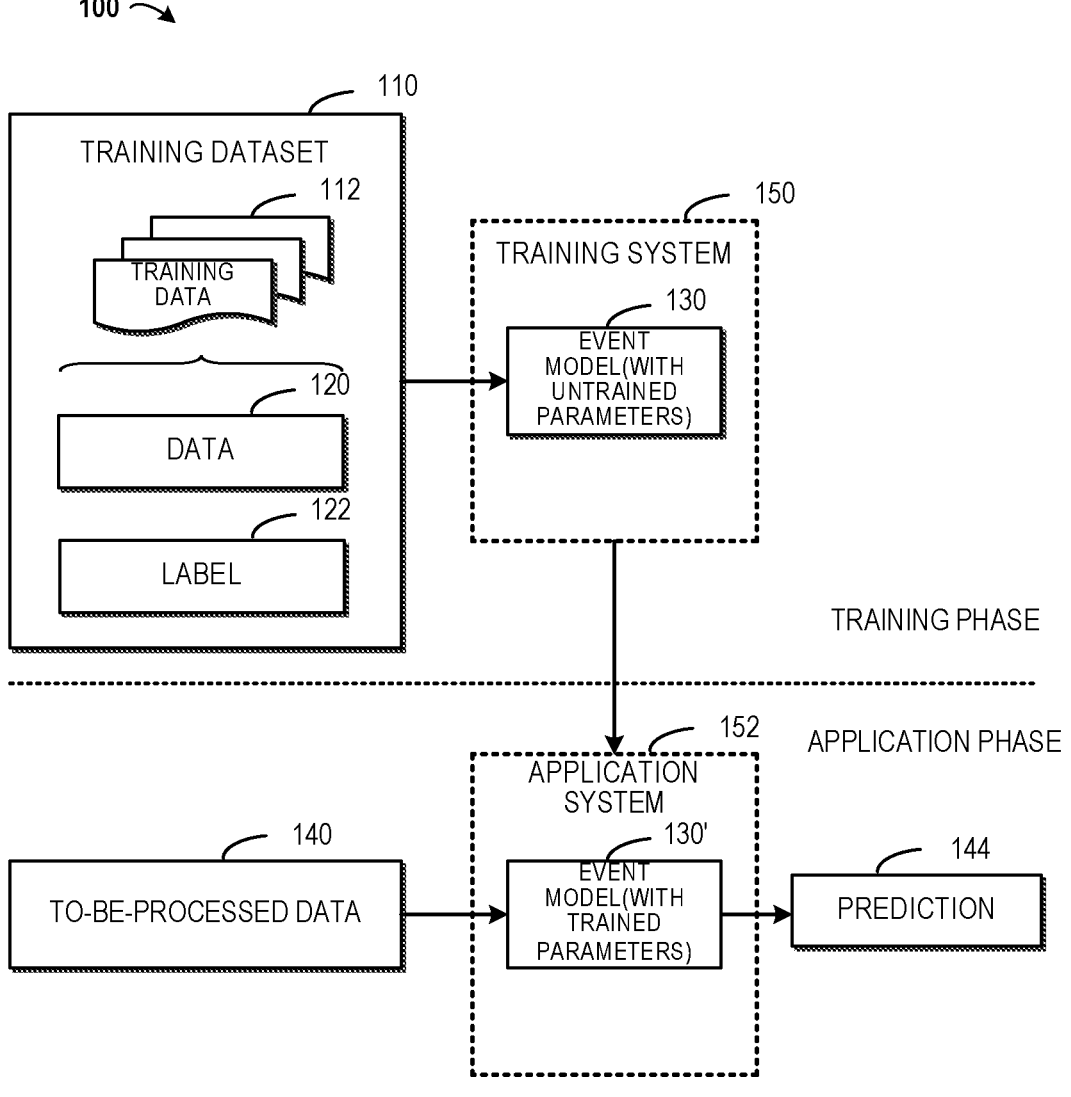
FIG. 1 illustrates an example environment for event processing according to the machine learning technique.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

For the purpose of description, the following paragraphs will provide more details by taking a recommendation system as an example environment. In the recommendation system, various objects may be sent to the user. Sometimes, the user is interested in an object and then performs a subscription or place an order. If the user is not interested in the object, he/she may pass the object and do nothing. By now, solutions have been provided for generating an event model for predicting events related to objects in the future. Hereinafter, reference will be made to FIG. 1 for more details about the event model, here FIG. 1 illustrates an example environment 100 for event processing according to the machine learning technique.

In FIG. 1, an event model 130 may be provided for the event processing. Here, the environment 100 includes a training system 150 and an application system 152. The upper portion of FIG. 1 shows a training phase, and the lower portion shows an application phase. Before the training phase, the event model 130 may be configured with untrained or partly trained parameters (such as initial parameters, or pre-trained parameters). In the training phase, the event model 130 may be trained in the training system 150 based on a training dataset 110 including a plurality of training data 112. Here, each training data 112 may have a two-tuple format, and may include data 120 (for example, data associated with the object and the events related to the object) and a label 122 for the event. Specifically, a large amount of training data 112 may be used to implement the training phase iteratively. After the training phase, the parameters of the event model 130 may be updated and optimized, and an event model 130' with trained parameters may be obtained. At this point, the event model 130' may be used to implement the predication task in the application phase. For example, the to-be-processed data 140 may be inputted into the application system 152, and then a corresponding prediction 144 may be outputted.

In FIG. 1, the model training system 150 and the model application system 152 may include any computing system with computing capabilities, such as various computing devices/systems, terminal devices, servers, and so on. The terminal device may involve any type of mobile device, fixed terminal, or portable device, including mobile phones, desktop computers, laptop computers, notebook computers, netbook computers, tablet computers, media computers, multimedia tablets, or any combination of the foregoing, including the accessories and peripherals of these devices or any combination thereof. Servers may include but are not limited to mainframes, edge computing nodes, computing devices in cloud environments, and so on. It should be understood that the components and arrangements in the environment 100 in FIG. 1 are only examples, and a computing system suitable for implementing the example implementation described in the present disclosure may include one or more different components, and other components. For example, the training system 150 and the application system 152 may be integrated in the same system or device.

Figure 2:
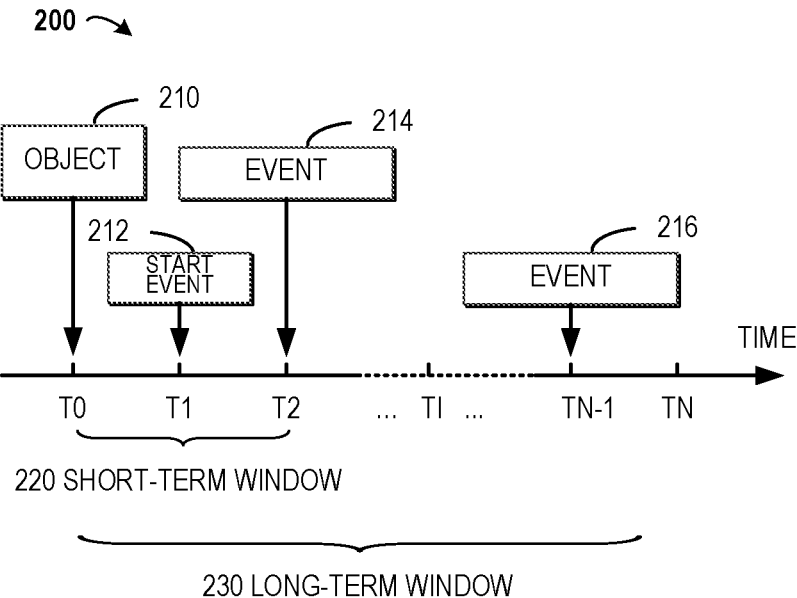
FIG. 2 illustrates an example diagram of events that are received at diffident time points according to implementations of the present disclosure.

As illustrated in FIG. 1, the training dataset 110 may include historical training data 112 collected from data logs of the recommendation system according to requirements of corresponding laws and regulations and relevant rules. However, the performance of the event model 130' is closely associated with a time span of the historical training data 112. Reference will be made to FIG. 2 for events that are received in the data recommendation system, here FIG. 2 illustrates an example diagram 200 of events that are received at diffident time points according to implementations of the present disclosure.

During operations of the recommending system, a lot of objects may be provided to the users. Taking an object 210 (such as a message, an advertisement, and so on) as an example, the object 210 may be provided to a user at a time point TO, for example, the object 210 may be displayed at a terminal device of the user. Then, multiple events related to the object 210 and the user may be received. For example, a start event 212 (for example, an event shows that the user opens the object 210) may be received at a time point T1. Further, deeper events may be received after the start event 212. In FIG. 2, a further event 214 and a further event 216 related to the object 210 may be received at subsequent time points T2 and Tn−1, respectively. It is to be understood that data about the user, the object and the event may not include any sensitive information. For example, all the data may be collected according to requirements of corresponding laws and regulations and relevant rules, and then may be converted into an invisible format (such as embeddings) for the protection purpose.

In the context of the present disclosure, the events 214 and 216 may be referred to as the conversion events, and the conversion event here indicates that the user behavior is converted towards a deeper interaction with the recommendation system. Usually, a conversion rate is a key factor for measure whether the object attracts the user's attention, and then event processing become a hot focus recently.

Multiple solutions have been proposed for event processing based on the training dataset within a specific time window. However, the training dataset within a fixed time window can only reflect a trend of events received within the fixed time duration. For example, data within in one day (or another time duration) may be used for training the event model 130 as illustrated in FIG. 1. Due to the time window only includes one day, although the event model 130' can describe a trend of whether a particular event is to be received in one day, it cannot make long-term predictions. In other words, although the event model 130' increases its immediacy in the prediction, the long-term accuracy level of the event model 130' is not satisfactory. In another example, if the time window includes a longer time duration such as 7 days, although the event model 130' may provide a long-term trend, it cannot implement short-term predictions. At this point, it is desired that the event model 130' may have the better performance in both long/short-term predications.

In view of the above, the present disclosure proposes an event processing solution based on multiple time windows. As illustrated in FIG. 2, the timeline may be divided into a long-term window 230 (also referred to as a first time window) and a short-term window 220 (also referred to as a first time window), and then the data associated with multiple time windows may be used for training the event model. In implementations of the present disclosure, the short-term window 220 and the long-term window 230 may cover different time durations, and data within multiple time windows are considered in the training phase. Accordingly, the trained event model may provide more accurate predictions for the short-term window 220 as well as the long-term time window 230.

Figure 3:
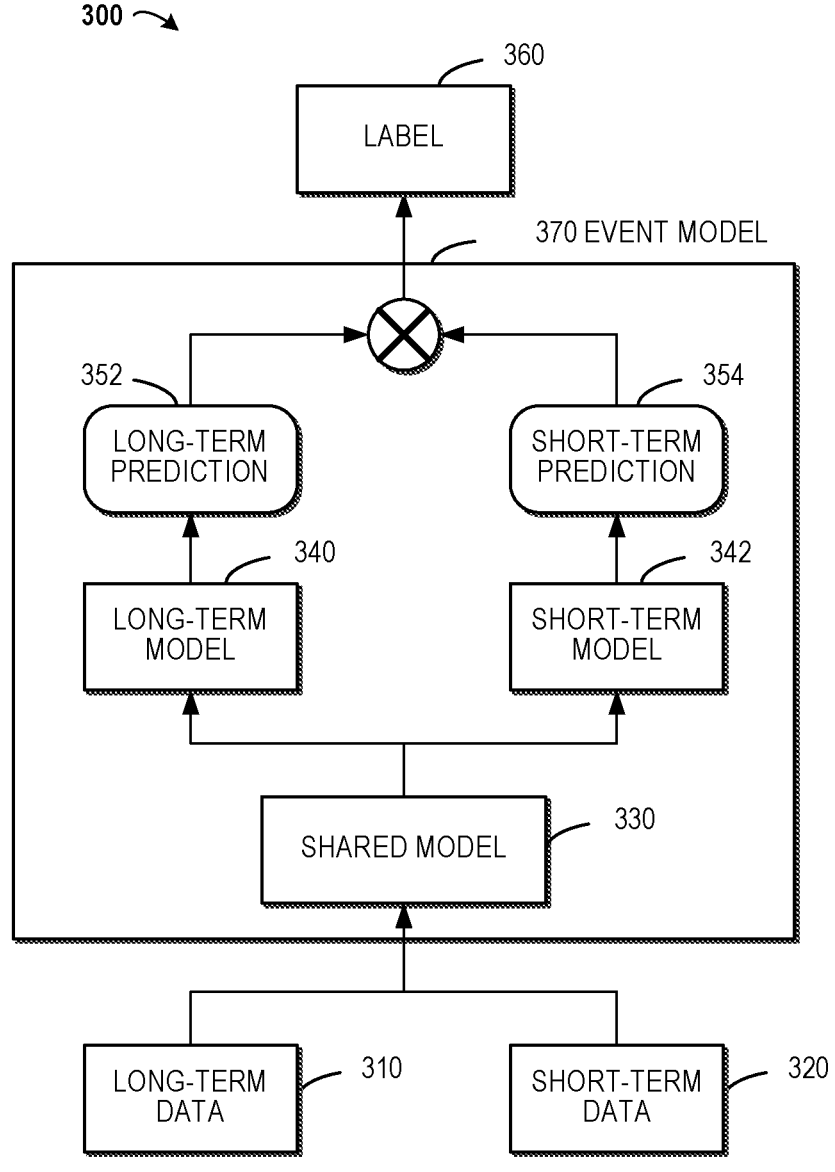
FIG. 3 illustrates an example diagram of an event model based on multiple time windows according to implementations of the present disclosure.

Hereinafter, referring to FIG. 3 for more details about the event processing. FIG. 3 illustrates an example diagram 300 of an event model 370 based on the multiple time windows according to implementations of the present disclosure. In FIG. 3, long-term data 310 (also referred to as the first data) associated with the long-term window 230 and short-term data 320 (also referred to as the second data) associated with the short-term window 220 may be obtained from the data logs in the recommendation system. Taking the long-term window 230 as an example, the long-term data 310 may comprise a first object and a first group of events that are related to the first object within the long-term window. For example, with respect to the object 210 in FIG. 2, the long-term data 310 may comprise an identification of the object 210 and a first group of events 212, 214, and 216 within the long-term window 230. Similarly, for the short-term window 220, the short-term data 320 may comprise the identification of the object 210 and a second group of events 212 and 214 within the short-term window 220.

Further, the event model 370 may be trained based on the long-term data 310 and the short-term data 320, such that the event model 370 may describe an association relationship between an object and an event related to the object. In the data recommendation system, the event model 370 may be trained by historical data that is collected during previous operations of the recommendation system, and then the event model 370 may be used to predict whether a particular event (such as events relates to the subscription or the order from the user) is to be received when a target object is displayed to the user. Here, the long-term data 310 may increase the accuracy level of the event model 370, and the short-term data 320 may increase the immediacy level of the event model 370.

In implementations of the present disclosure, the short-term window 220 and the long-term window 230 may have different time durations. Here, a length of the window may have a predetermined value. For example, the short-term window 220 may be set to one day (or another value) and the long-term window 230 may have another length (such as 7 days) longer than the short-term window 230. Alternatively and/or in addition to, the length may be determined according to statistic data associated with different events. For example, if the statistic shows that the simple events (such as events related to the subscription) are usually received within 12 hours after the start event for the object, then the short-term window 220 may be set to 12 hours. If the statistic shows that deeper events (such as events relates to the order) are usually received within 7 days, then the long-term window 230 may be set to 24*7=168 hours.

Once the short-term window 220 and the long-term window 230 are determined, respective data may be obtained for the above two windows. The following paragraphs will provide more details about the data obtaining by taking the long-term window 230 as an example. Meanwhile, a similar procedure may be implemented for the short-term window 220. In implementations of the present disclosure, the data logs in the recommendation system may be analyzed for extracting the long-term data 310. Table 1 shows an example data structure of the data logs.

TABLE 1

| | Example Data Structure of Data Log | | | |
|---|---|---|---|---|
| No. | Object ID | Send Time | Event | Event Time |
| 1 | Obj-1 | T11 | Start Event | T21 |
| 2 | Obj-1 | T12 | Conversion event | T22 |
| 3 | Obj-2 | T13 | Start Event | T23 |
| . . . | . . . | . . . | . . . | . . . |
| N | Obj-k | T14 | Conversion event | T24 |

In Table 1, "No." represents the number of the logs, "Object ID" represents the ID of the object that is sent to the user, "Send Time" represents the time point when the object is sent to the user, "Event" represents an event type of the event, and "Event Time" represents the time point when the event related to the object is received. It is to be understood that "Send Time" and "Event Time" in Table 1 may be measured by system timestamps of the recommendation system and then represented by an embedding so as to remove the sensitive information. For example, "T11" indicates that "Obj-1" is sent at a time point T11. The data logs as shown in Table 1 may be updated in real time during the operations of the recommendation system, and the training phase may be implemented in an iterative way. In order to obtain the long-term data 310, objects that are sent within the long-time window 230 may be identified. Supposing long-term window 230 is set to 7 days and the current time is represented as $T_{current}$, then logs with the "Send Time" within 7 days may be retrieved. At this point, logs with the "Send Time" between $T_{current}-7*24*60*60$ (i.e., 7 days before) and $T_{current}$ may be retrieved from Table 1. Alternatively and/or in addition to, in order to ensure that the events are really associated with the long-term window 230, a rule may be defined: "Send Time" should be within a range at the beginning of the 7 days. For example, logs with the "Send Time" between $T_{current}-7*24*60*60$ (i.e., 7 days before) and $T_{current}-6*24*60*60$ (i.e., 6 days before) may be retrieved from Table 1.

TABLE 2

| | | | Example Log | |
| --- | --- | --- | --- | --- |
| No. | Object ID | Send Time | Event | Event Time |
| 1 | Obj-1 | T11 | Start Event | T21 |
| 2 | Obj-1 | T12 | Conversion event | T22 |
| . . . | . . . | . . . | . . . | . . . |

Table 2 shows logs meeting the above rule. As shown in Table 2, the object "Obj-1" is sent between the required time duration, and then events related to the object "Obj-1" are within the long-term window 230 and may be taken as the group of events for the object "Obj-1." In Table 2, the start event with "Event Time" of "T21" and the conversion event with the "Event Time" of "T22" are obtained. Further, a similar procedure may be implemented for the short-term window 220 so as to obtain the short-term data 320. With implementations of the present disclosure, both the long-term data 310 and the short-term data 320 may be obtained in an easy and effective way by filtering data logs in the recommendation system. Further, the long-term data 310 and the short-term data 320 may increase the immediacy and accuracy level of the event model 370.

Figure 4A:
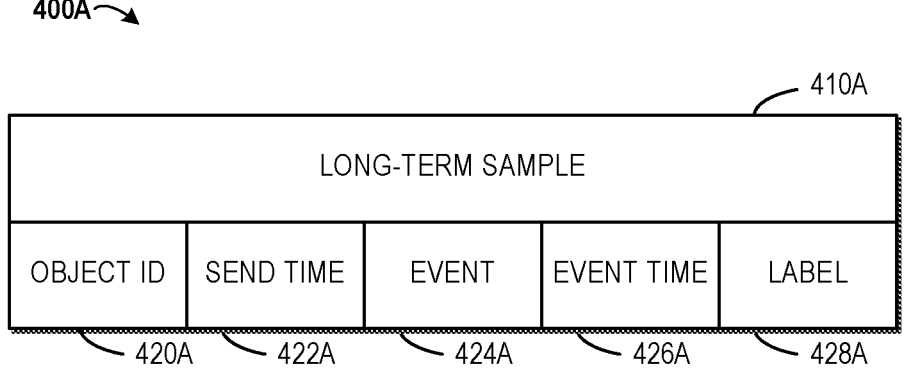
FIG. 4A illustrates an example diagram of a long-term sample based on a long-term window according to implementations of the present disclosure.

In implementations of the present disclosure, the long-term data 310 and the short-term data 320 may be processed for generating respective training samples for the two time windows. Specifically, a long-term sample may be generated from the long-term data 310, and a short-term sample may be generated from the short-term data 320. Further, the event model 370 may be obtained by training an initial model with the long-term sample and short-term sample. FIG. 4A illustrates an example diagram 400A of a long-term sample 410A based on the long-term window 230 according to implementations of the present disclosure. Here, the long-term sample 410A may comprise: an object ID 420A for representing the identification of the object on which the events are related to; send time 422A for representing the time point when the object is sent; an event 424A for representing the event type of the event; event time 426A for representing the time point when the event is received. Further, the long-term sample 410A may comprise a label 428A for representing whether the retrieved group of events comprises a conversion event.

In implementations of the present disclosure, the long-term sample 410A may be generated based on the long-term data 310, where the object ID 420A, the send time 422A, the event 424A and the event time 426A may be directly read from Table 2. As to the label 428A, it may be determined from the long-term data 310 by checking whether a conversion event for the object is included in Table 2. Initially, with respect to a specific object on which a start event is received, the label 428A may be set to be negative. As shown in Table 2, with respective to the object "Obj-1", the start event is received at the time point "T21," and thus the label 428A may be set to a negative value (such as −1 or another value). Further, the label 428A may be updated to a positive value (such as 1 or another value) because a conversation event is received at the time point "T22" after the start event. As a result, the long-term sample 410A may be represented as a vector of (Obj-1, T21, Open, T22, 1). It is to be understood that all the data in the long-term sample 410A is represented by an invisible format and does not include sensible information.

It is to be understood that the above paragraphs only provide a simple situation for generating the long-term sample 410A for the object "Obj-1." Usually, more than one object may be found from the data logs and thus each object may be processed in a similar for generating a corresponding sample. For example, multiple objects with "Send Time" between $T_{current}-7*24*60*60$ and $T_{current}-6*24*60*60$ may be retrieved, and then an individual sample may be generated from each of the multiple objects.

Figure 4B:
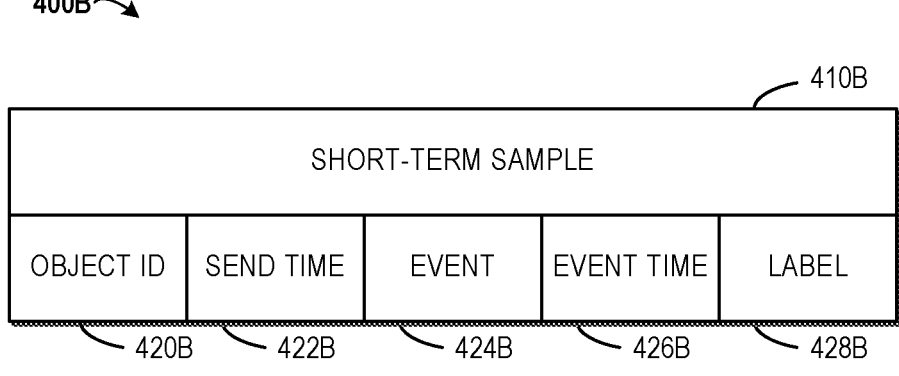
FIG. 4B illustrates an example diagram of a short-term sample based on a short-term window according to implementations of the present disclosure.

The above paragraphs have provided details for generating the long-term sample 410A. Further, this procedure may be repeated for the all the short-term data 320 so as to generate the short-term sample in the similar way. FIG. 4B illustrates an example diagram 400B of a short-term sample 410B based on the short-term window 220 according to implementations of the present disclosure. Similarly, the short-term sample 410B may comprise: an object ID 420B, send time 422B, an event 424B, event time 426B, and a label 428B. Supposing the object "Obj-3" is extracted from the short-term data 320, and events related to the object "Obj-3" may be determined. If no conversion event is detected after the start event within the short-term window 220, then the short-term sample 410B may be represented as a vector of (Obj-3, time1, Open, time2, −1). If a conversion event is detected, then the short-term sample 410B may be represented as a vector of (Obj-3, time1, Conversion, time3, −1). Here, "time1" represents the send time for the object Obj-3, "time2" represents the event time for the start event, and "time3" represents the event time for the conversion event.

With these implementations, both the long-term data 310 and the short-term data 320 may be processed in a similar way, and thus the long-term sample 410A and the short-term sample 410B may be generated in an easy and effective way.

Returning back to FIG. 3, the event model 370 may comprise: a long-term model 340 (also referred to as a first model) between an object and a first prediction of whether a conversion event is to be received within the first time window; and a short-term model 342 (also referred to as a second model) between an object and a second prediction of whether a conversion event is to be received within the second time window. Therefore, the two models may describe respective event trends for both the long-term window 230 and the short-term window 220. Further, a shared model 330 represents a model that is shared by the long-term model 340 and the short-term model 342. Each model may include one more layers and may be implemented by existing machine learning models.

In implementations of the present disclosure, the long-term model 340 and the short-term model 342 may be obtained by training respective portions of the initial model with the long-term sample 410A and the short-term sample 420B, respectively. The following paragraphs will describe the training phase by taking the long-term window 230 as an example. For example, the initial model may comprise an initial long-term model, and then the initial long-term model may be trained by the long-term sample 410A. Specifically, data in the long-term sample 410A excluding the label 428A may be inputted and then a prediction may be outputted from the initial long-term model, and then outputted at label 360 from the event model 370. Further, the prediction may be compared with the label 428A in the long-term sample 410A for determining a loss, and then parameters in the initial long-term model may be optimized towards a direction minimizing the loss.

In implementations of the present disclosure, the initial long-term model may be trained iteratively with multiple long-term samples, such that the long-term model 340 may be well trained. The initial short-term model may be processed in a similar way based on the short-term sample 420B, and then the well-trained short-term model 342 may be obtained. With these implementations of the present disclosure, once the long-term model 340 and the short-term model 342 are obtained, the event model 370 that includes the two models 340 and 342 may work together to provide a final prediction. With these implementations of the present disclosure, both the long/short-term aspects of the event trend are considered in the event model 370, and then both of the accurate and immediacy the level of the event model 370 may be increased significantly.

Further, data associated with a target object may be inputted into the event model 370 for a predication. For example, the inputted data may be represented in a vector of (object ID, send time, event, event time). Here, the object ID represents an object that is sent to a user, the send time represents a time point when the object is sent. The event represents a start event, i.e., it indicates that the object is opened by the user, and the event time represents the time point when the object is opened by the user. In this example, if an object "Obj-4 is sent at the time point of "time4" and is opened by the user at the time point of "time5," then the vector may be represented as (Obj-4, time4, Open, time5).

The vector may be inputted into the event model 370, and then the long-term model 340 may output a long-term predication 352 for indicating a probability that a conversion event is to be received for the object "Obj-4" within 7 days. Meanwhile, the short-term model 342 may output a short-term predication 354 for indicating a probability that a conversion event related to the object "Obj-4" is to be received within one day. Further, the event model 370 may output a final predication indicating whether a conversion event is to be received based on the following Formula 1.

$$\mathrm{pre}_{final}=(\mathrm{pre}_{long}+\mathrm{pre}_{short})/2 \qquad \text{Formula 1}$$

In Formula 1, $\mathrm{pre}_{final}$ represents a final predication for the event predication, $\mathrm{pre}_{long}$ represents the long-term predication 352, and $\mathrm{pre}_{short}$ represents the short-term predication 354. In Formula 1, the long-term predication 352 and the short-term predication 354 provide equal contributions to the final predication. As the event model 370 considers both the immediacy and accuracy aspects for the events, future predications may be based on immediate and accurate grounds, and thus the predication may be implemented in a more effective way.

Figure 5:
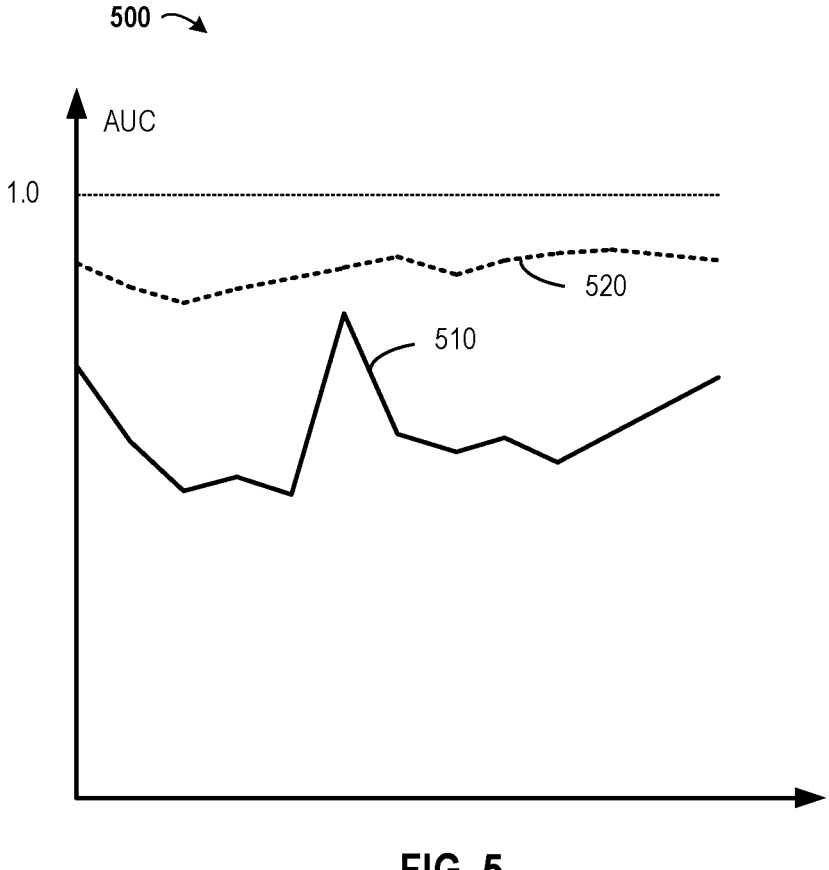
FIG. 5 illustrates an example diagram for performance of an event model compared with a conventional event model according to implementations of the present disclosure.

FIG. 5 illustrates an example diagram 500 for performance of an event model compared with a conventional event model according to implementations of the present disclosure. Usually, an Area Under Curve (AUC) represents performance of a predication model, and the closer the prediction is to 1, the more accurate the prediction model is. In FIG. 5, a curve 510 indicates the AUC value for the conventional event model that is trained based on a single time window, and a curve 520 indicates the AUC value for the event model 370 based on multiple time windows. Clearly, the curve 520 is much closer to 1 than the curve 510, which shows that the event model 370 has better performance than the conventional event model.

Figure 6:
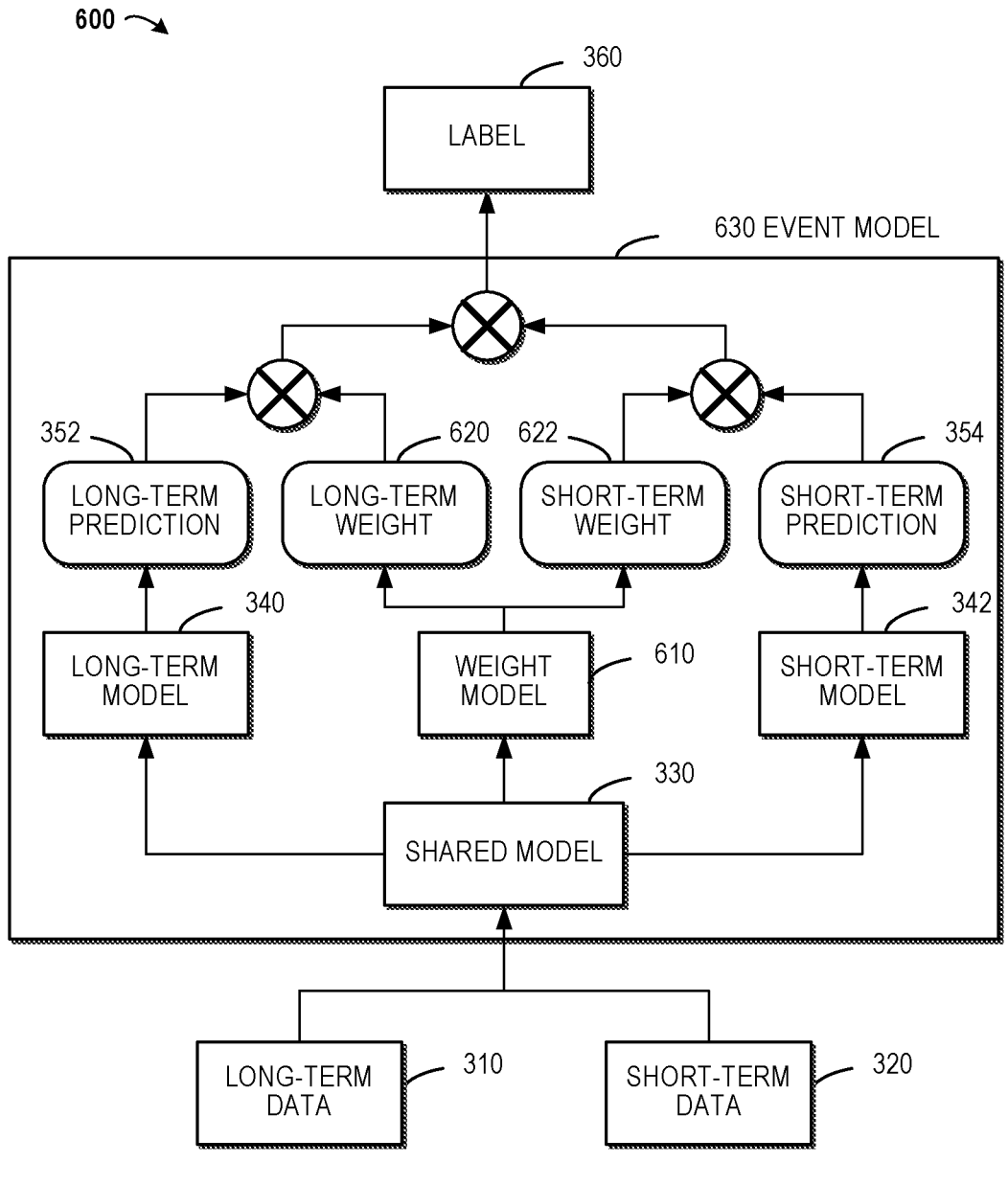
FIG. 6 illustrates an example diagram of an event model based on multiple time windows according to implementations of the present disclosure.

In implementations of the present disclosure, contributions of the long-term window 230 and the short-term window 220 are not always the same, therefore respective weights may be assigned to the two time windows. Referring to FIG. 6 for more details, here FIG. 6 illustrates an example diagram 600 of an event model 630 based on multiple time windows according to implementations of the present disclosure. Compared with the event model 370 in FIG. 3, the event model 630 may further comprise a weight model 610 describing an association relationship between a long-term weight 620 (also referred to as a first weight) for the long-term window 230 and a short-term weight 622 (also referred to as a second weight) for the short-term window 220. At this point, the weight model 610 may be determined by training an initial weight model with long-term sample 410A and the short-term sample 410B.

Specifically, data in the long-term sample 410A (excluding the label 428A) and data in the short-term sample 410B (excluding the label 428B) may be inputted. Then, a corresponding loss may be determined, and parameters in the initial weight model may be optimized towards a direction minimizing the loss. With these implementations of the present disclosure, contribution levels for the long-term window 230 and the short-term window 220 may be considered, respectively. Therefore, the accuracy and immediacy level of the event model 630 may further be increased.

In implementations of the present disclosure, if a start event is received for a target object, the event model 630 may be used for providing a predication of whether a conversion event is to be received for the target object. Continuing the above example, the vector of (Obj-4, time4, Open, time5) may be inputted into the event model 630. At this point, the long-term model 340 may output the long-term predication 352, the short-term model 342 may output the short-term predication 354, and the weight modal 330 may output the long-term weight 620 and the short-term weight 622. Further, the event model 630 may output a final predication indicating whether a conversion event is to be received based on the following Formula 2.

$$\mathrm{pre}_{final}=\mathrm{pre}_{long}*\mathrm{weight}_{long}+\mathrm{pre}_{short}*\mathrm{weight}_{short} \qquad \text{Formula 2}$$

In Formula 1, $\mathrm{pre}_{final}$ represents a final predication for the event predication, $\mathrm{pre}_{long}$ represents the long-term predication 352, $\mathrm{pre}_{short}$ represents the short-term predication 354, $\mathrm{weight}_{long}$ represents the long-term weight 620, and $\mathrm{weight}_{short}$ represents the short-term weight 622. In Formula 2, a constrain as provided in Formula 3 may be applied.

$$\mathrm{weight}_{long}+\mathrm{weight}_{short}=1 \qquad \text{Formula 3}$$

In Formula 2, the long-term predication 352 and the short-term predication 354 may provide different contributions to the final predication. For example, if the data logs for training the event model 630 shows that more conversion events are received within the long-term window 230, then the long-term weight 620 may be greater than the short-term weight 622. For example, $\mathrm{weight}_{long}$=0.8, and $\mathrm{weight}_{short}$=0.2. With these implementations of the present disclosure, the long-term weight 620 and the short-term weight

622 may be determined in a dynamic way, and then the final predication may be obtained in a more reliable way.

Figure 7:
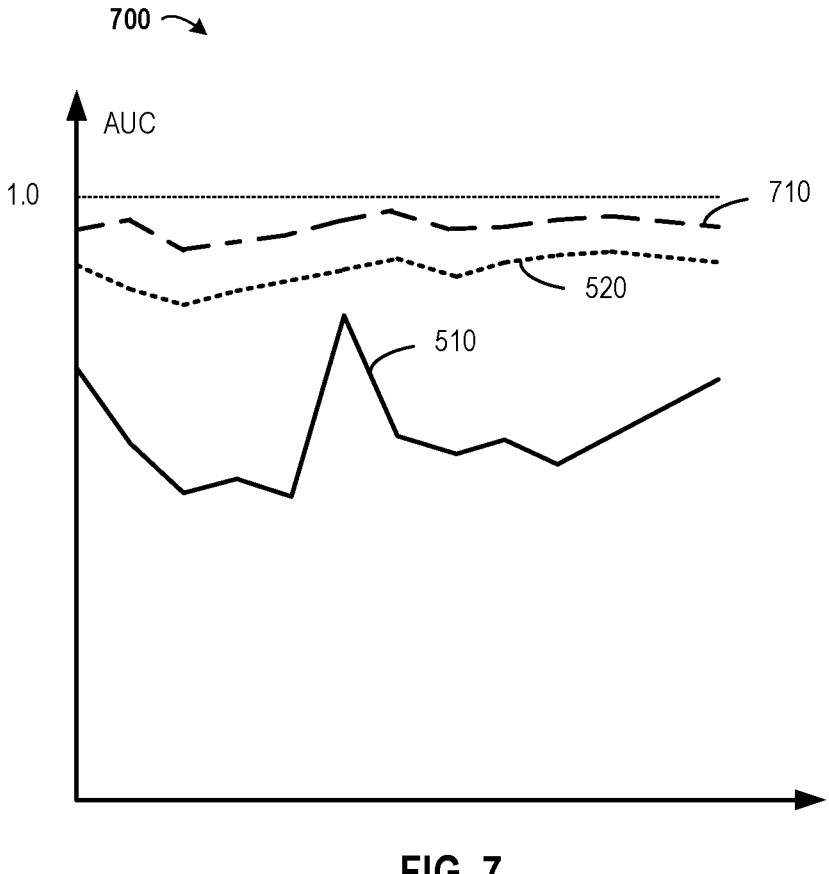
FIG. 7 illustrates an example diagram for performance of an event model compared with a conventional event model according to implementations of the present disclosure.

FIG. 7 illustrates an example diagram 700 for performance of an event model compared with a conventional event model according to implementations of the present disclosure. In FIG. 7, the curve 510 indicates the AUC value for the conventional event model that is trained based on a single time window, the curve 520 indicates the AUC value for the event model 370 (without weights for multiple time windows), and a curve 710 indicates the AUC value for the event model 630 (with weights for multiple time windows). Clearly, the curve 710 is much closer to 1 than the curve 520, which shows that the event model 630 has better performance than the event model 370.

Although the above paragraphs provide implementations where two time windows are involved in the event models 370 and 630, more time windows may be used for the event model. For example, besides the long-term window 230 and the short-term window 220, another medium-term window (such as four days) may be provided in the training phase. At this point, the event models 370 and 630 may comprise the long-term model 340, the short-term model 342 as well as a medium-term model. Therefore, the event model may take full advantages of data in various time windows, such that the performance of the event model may further be increased.

The above paragraphs have described details for the event processing. According to implementations of the present disclosure, a method is provided for event processing. Reference will be made to FIG. 8 for more details about the method, where FIG. 8 illustrates an example flowchart of a method 800 for event processing based on multiple time windows according to implementations of the present disclosure. At a block 810, first data associated with a first time window is obtained, the first data comprising a first object and a first group of events that are related to the first object. At a block 820, second data associated with a second time window is obtained, the second data comprising a second object and a second group of events that are related to the second object, the second time window being different from the first time window. At a block 830, an event model describing an association relationship between an object and an event that is related to the object is determined based on the first and second data.

In implementations of the present disclosure, obtaining the first data comprises: identifying the first object in response to a determination that the first object is sent within the first time window; and selecting the first group of events in response to a determination that the first group of events are received within the first time window.

In implementations of the present disclosure, determining the event model comprises: generating a first sample and a second sample for determining the event model based on the first and second data, respectively; and determining the event model by training an initial model with the first and second samples.

In implementations of the present disclosure, generating the first sample comprises: determining a first label for indicating whether the first group of events comprises a conversion event after a start event; and generating the first sample based on the first data and the first label.

In implementations of the present disclosure, determining the first label comprises: setting the first label to be negative in response to a determination that the first group of events comprises the start event; and updating the first label to be positive in response to a determination that the first group of events comprises the conversion event after the start event.

In implementations of the present disclosure, the event model comprises: a first model between an object and a first prediction of whether a conversion event related to the object is to be received within the first time window; and a second model between an object and a second prediction of whether a conversion event related to the object is to be received within the second time window.

In implementations of the present disclosure, determining the event model by training the initial model with the first and second samples comprises: determining the first model by training a first portion in the initial model with the first sample; and determining the second model by training a second portion in the initial model with the second sample.

In implementations of the present disclosure, the event model further comprises: a weight model describing an association relationship between a first weight for the first time window and a second weight for the second time window, and determining the event model further comprises: determining the weight model based on the first and second samples.

In implementations of the present disclosure, the method 800 further comprising: in response to a determination that a start event is related to a target object, determining a predication of whether a conversion event related to the target object is to be received based on the event model.

In implementations of the present disclosure, determining the predication comprises: receiving a first prediction from the first model, a second prediction from the second model, and a weight from the weight model based on the target object and the start event, respectively; and determining the prediction based on the first and second predictions and the weight.

According to implementations of the present disclosure, an apparatus is provided for event processing. The apparatus comprises: a first obtaining unit, configured for obtaining first data associated with a first time window, the first data comprising a first object and a first group of events that are related to the first object; a second unit, configured for obtaining second data associated with a second time window, the second data comprising a second object and a second group of events that are related to the second object, the second time window being different from the first time window; and a determining unit, configured for determining an event model describing an association relationship between an object and an event that is related to the object based on the first and second data. Further, the apparatus may comprise other units for implementing other steps in the method 800.

According to implementations of the present disclosure, an electronic device is provided for implementing the method 800. The electronic device comprises: a computer processor coupled to a computer-readable memory unit, the memory unit comprising instructions that when executed by the computer processor implements a method for event processing. The method comprises: obtaining first data associated with a first time window, the first data comprising a first object and a first group of events that are related to the first object; obtaining second data associated with a second time window, the second data comprising a second object and a second group of events that are related to the second object, the second time window being different from the first time window; and determining an event model describing an association relationship between an object and an event that is related to the object based on the first and second data.

In implementations of the present disclosure, obtaining the first data comprises: identifying the first object in response to a determination that the first object is sent within the first time window; and selecting the first group of events in response to a determination that the first group of events are received within the first time window.

In implementations of the present disclosure, determining the event model comprises: generating a first sample and a second sample for determining the event model based on the first and second data, respectively; and determining the event model by training an initial model with the first and second samples.

In implementations of the present disclosure, generating the first sample comprises: determining a first label for indicating whether the first group of events comprises a conversion event after a start event; and generating the first sample based on the first data and the first label.

In implementations of the present disclosure, determining the first label comprises: setting the first label to be negative in response to a determination that the first group of events comprises the start event; and updating the first label to be positive in response to a determination that the first group of events comprises the conversion event after the start event.

In implementations of the present disclosure, the event model comprises: a first model between an object and a first prediction of whether a conversion event related to the object is to be received within the first time window; and a second model between an object and a second prediction of whether a conversion event related to the object is to be received within the second time window.

In implementations of the present disclosure, determining the event model by training the initial model with the first and second samples comprises: determining the first model by training a first portion in the initial model with the first sample; and determining the second model by training a second portion in the initial model with the second sample.

In implementations of the present disclosure, the event model further comprises: a weight model describing an association relationship between a first weight for the first time window and a second weight for the second time window, and determining the event model further comprises: determining the weight model based on the first and second samples.

In implementations of the present disclosure, the method 800 further comprising: in response to a determination that a start event is related to a target object, determining a predication of whether a conversion event related to the target object is to be received based on the event model.

In implementations of the present disclosure, determining the predication comprises: receiving a first prediction from the first model, a second prediction from the second model, and a weight from the weight model based on the target object and the start event, respectively; and determining the prediction based on the first and second predictions and the weight.

According to implementations of the present disclosure, a computer program product, the computer program product comprising a computer readable storage medium having program instructions embodied therewith, the program instructions executable by an electronic device to cause the electronic device to perform the method 800.

Figure 9:
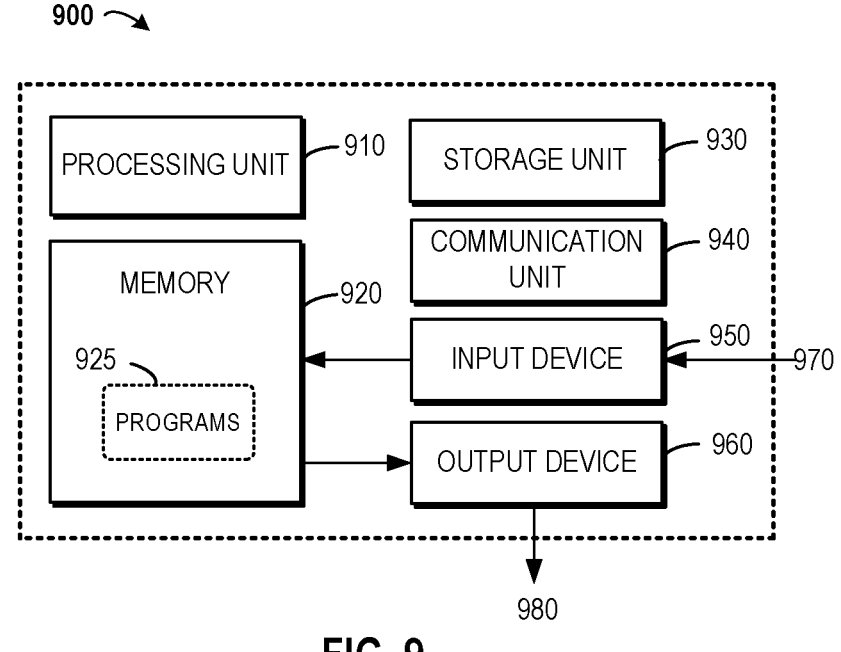
FIG. 9 illustrates a block diagram of a computing device in which various implementations of the present disclosure can be implemented.

FIG. 9 illustrates a block diagram of a computing device 900 in which various implementations of the present disclosure can be implemented. It would be appreciated that the computing device 900 shown in FIG. 9 is merely for purpose of illustration, without suggesting any limitation to the functions and scopes of the present disclosure in any manner. The computing device 900 may be used to implement the above method 1000 in implementations of the present disclosure. As shown in FIG. 9, the computing device 900 may be a general-purpose computing device. The computing device 900 may at least comprise one or more processors or processing units 910, a memory 920, a storage unit 930, one or more communication units 940, one or more input devices 950, and one or more output devices 960.

The processing unit 910 may be a physical or virtual processor and can implement various processes based on programs stored in the memory 920. In a multi-processor system, multiple processing units execute computer executable instructions in parallel so as to improve the parallel processing capability of the computing device 900. The processing unit 910 may also be referred to as a central processing unit (CPU), a microprocessor, a controller, or a microcontroller.

The computing device 900 typically includes various computer storage medium. Such medium can be any medium accessible by the computing device 900, including, but not limited to, volatile and non-volatile medium, or detachable and non-detachable medium. The memory 920 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 930 may be any detachable or non-detachable medium and may include a machine-readable medium such as a memory, flash memory drive, magnetic disk, or another other media, which can be used for storing information and/or data and can be accessed in the computing device 900.

The computing device 900 may further include additional detachable/non-detachable, volatile/non-volatile memory medium. Although not shown in FIG. 9, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 940 communicates with a further computing device via the communication medium. In addition, the functions of the components in the computing device 900 can be implemented by a single computing cluster or multiple computing machines that can communicate via communication connections. Therefore, the computing device 900 can operate in a networked environment using a logical connection with one or more other servers, networked personal computers (PCs) or further general network nodes.

The input device 950 may be one or more of a variety of input devices, such as a mouse, keyboard, tracking ball, voice-input device, and the like. The output device 960 may be one or more of a variety of output devices, such as a display, loudspeaker, printer, and the like. By means of the communication unit 940, the computing device 900 can further communicate with one or more external devices (not shown) such as the storage devices and display device, with one or more devices enabling the user to interact with the computing device 900, or any devices (such as a network card, a modem, and the like) enabling the computing device 900 to communicate with one or more other computing devices, if required. Such communication can be performed via input/output (I/O) interfaces (not shown).

In some implementations, instead of being integrated in a single device, some, or all components of the computing device 900 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations can be made based on what is described and illustrated in the present disclosure.

What is claimed is:

1. A method for event processing, comprising:
obtaining first data associated with a first time window, the first data comprising first objects and first groups of events, wherein each of the first groups of events is related to a corresponding first object among the first objects;
obtaining second data associated with a second time window, the second data comprising second objects and second groups of events, wherein each of the second groups of events is related to a corresponding second object among the second objects, and a duration of the second time window is shorter than a duration of the first time window;
generating first training samples based on the first data and generating second training samples based on the second data; and
training an initial model on the first training samples and the second training samples to obtain an event model, wherein the event model is configured to predict whether a particular event is to be received from a user in response to an object being displayed to the user.

2. The method of claim 1, wherein obtaining the first data comprises:
identifying the first object in response to a determination that the first object is sent within the first time window; and
selecting the first group of events in response to a determination that the first group of events are received within the first time window.

3. The method of claim 1, wherein generating a first sample among the first training samples comprises:
determining a first label for indicating whether the first group of events comprises a conversion event after a start event; and
generating the first sample based on the first data and the first label.

4. The method of claim 3, wherein determining the first label comprises:
setting the first label to be negative in response to a determination that the first group of events comprises the start event; and
updating the first label to be positive in response to a determination that the first group of events comprises the conversion event after the start event.

5. The method of claim 3, wherein the event model comprises:
a first model between an object and a first prediction of whether a conversion event related to the object is to be received within the first time window; and
a second model between an object and a second prediction of whether a conversion event related to the object is to be received within the second time window.

6. The method of claim 5, wherein determining the event model by training the initial model with the first and second samples comprises:
determining the first model by training a first portion in the initial model with the first sample; and
determining the second model by training a second portion in the initial model with the second sample.

7. The method of claim 6, wherein the event model further comprises: a weight model describing an association relationship between a first weight for the first time window and a second weight for the second time window, and determining the event model further comprises: determining the weight model based on the first and second samples.

8. The method of claim 7, further comprising: in response to a determination that a start event is related to a target object, determining a predication of whether a conversion event related to the target object is to be received based on the event model.

9. The method of claim 8, wherein determining the predication comprises:
receiving a first prediction from the first model, a second prediction from the second model, and a weight from the weight model based on the target object and the start event, respectively; and determining the prediction based on the first and second predictions and the weight.

10. An electronic device, comprising a computer processor coupled to a computer-readable memory unit, the memory unit comprising instructions that when executed by the computer processor cause the computer processor to perform operations, the operations comprising:

obtaining first data associated with a first time window, the first data comprising first objects and first groups of events, wherein each of the first groups of events is related to a corresponding first object among the first objects;

obtaining second data associated with a second time window, the second data comprising second objects and second groups of events, wherein each of the second groups of events is related to a corresponding second object among the second objects, and a duration of the second time window is shorter than a duration of the first time window;

generating first training samples based on the first data and generating second training samples based on the second data; and training an initial model on the first training samples and the second training samples to obtain an event model, wherein the event model is configured to predict whether a particular event is to be received from a user in response to an object being displayed to the user.

11. The device of claim 10, wherein obtaining the first data comprises:

identifying the first object in response to a determination that the first object is sent within the first time window; and selecting the first group of events in response to a determination that the first group of events are received within the first time window.

12. The device of claim 10, wherein generating a first sample among the first training samples comprises:

determining a first label for indicating whether the first group of events comprises a conversion event after a start event; and generating the first sample based on the first data and the first label.

13. The device of claim 12, wherein determining the first label comprises:

setting the first label to be negative in response to a determination that the first group of events comprises the start event; and updating the first label to be positive in response to a determination that the first group of events comprises the conversion event after the start event.

14. The device of claim 12, wherein the event model comprises:

a first model between an object and a first prediction of whether a conversion event related to the object is to be received within the first time window; and a second model between an object and a second prediction of whether a conversion event related to the object is to be received within the second time window.

15. The device of claim 14, wherein determining the event model by training the initial model with the first and second samples comprises:

determining the first model by training a first portion in the initial model with the first sample; and determining the second model by training a second portion in the initial model with the second sample.

16. The device of claim 15, wherein the event model further comprises: a weight model describing an association relationship between a first weight for the first time window and a second weight for the second time window, and determining the event model further comprises: determining the weight model based on the first and second samples.

17. The device of claim 16, the operations further comprising:

in response to a determination that a start event is related to a target object, determining a predication of whether a conversion event related to the target object is to be received based on the event model, comprising:

receiving a first prediction from the first model, a second prediction from the second model, and a weight from the weight model based on the target object and the start event, respectively; and determining the prediction based on the first and second predictions and the weight.

18. A computer program product, the computer program product comprising a computer readable storage medium having program instructions embodied therewith, the program instructions executable by an electronic device to cause the electronic device to perform operations, the operations comprise:

obtaining first data associated with a first time window, the first data comprising first objects and first groups of events, wherein each of the first groups of events is related to a corresponding first object among the first objects;

obtaining second data associated with a second time window, the second data comprising second objects and second groups of events, wherein each of the second groups of events is related to a corresponding second object among the second objects, and a duration of the second time window is shorter than a duration of the first time window;

generating first training samples based on the first data and generating second training samples based on the second data; and training an initial model on the first training samples and the second training samples to obtain an event model, wherein the event model is configured to predict whether a particular event is to be received from a user in response to an object being displayed to the user.

* * * * *